United States Patent
Fujiwara (10) Patent No.: US 10,513,310 B2
(45) Date of Patent: Dec. 24, 2019

(54) BICYCLE BATTERY HOLDER AND BICYCLE BATTERY UNIT

(71) Applicant: Shimano Inc., Sakai, Osaka (JP)

(72) Inventor: Takeshi Fujiwara, Osaka (JP)

(73) Assignee: Shimano Inc., Osaka (JP)

(*) Notice: Subject to any disclaimer, the term of this patent is extended or adjusted under 35 U.S.C. 154(b) by 613 days.

(21) Appl. No.: 15/057,980

(22) Filed: Mar. 1, 2016

(65) Prior Publication Data

US 2016/0288875 A1  Oct. 6, 2016

(30) Foreign Application Priority Data

Mar. 31, 2015  (JP) .................................. 2015-073399

(51) Int. Cl.
| B62M 6/90 | (2010.01) |
| H01M 2/10 | (2006.01) |
| B62M 6/55 | (2010.01) |
| B62H 5/00 | (2006.01) |

(52) U.S. Cl.
CPC .............. *B62M 6/90* (2013.01); *B62H 5/001* (2013.01); *B62M 6/55* (2013.01); *H01M 2/1083* (2013.01); *H01M 2/1077* (2013.01); *H01M 2220/20* (2013.01)

(58) Field of Classification Search
CPC ........... B62H 5/001; B62M 6/55; B62M 6/90; H01M 2220/20; H01M 2/1077; H01M 2/1083

See application file for complete search history.

(56) References Cited

U.S. PATENT DOCUMENTS

| 6,423,443 | B1* | 7/2002 | Tsuboi .................... B60K 1/04 180/68.5 |
| 6,428,925 | B1* | 8/2002 | Takeno .................. H01M 2/105 429/159 |
| 6,669,220 | B2 | 12/2003 | Meggiolan |
| 6,896,277 | B2 | 5/2005 | Meggiolan |
| 7,100,932 | B2 | 9/2006 | Meggiolan |
| 7,267,352 | B2 | 9/2007 | Ishikawa |
| 7,393,125 | B1 | 7/2008 | Lai |
| 7,934,576 | B2 | 5/2011 | Munksoe |
| 2005/0156001 | A1 | 7/2005 | Dal Pra et al. |
| 2006/0186158 | A1* | 8/2006 | Ishikawa .................. B62J 11/00 224/419 |
| 2007/0000388 | A1 | 1/2007 | Huang et al. |
| 2009/0261134 | A1* | 10/2009 | Tetsuka .................... B62J 11/00 224/412 |

(Continued)

FOREIGN PATENT DOCUMENTS

| CN | 104377339 A | 2/2015 |
| JP | 10 16869 A | 1/1998 |

(Continued)

*Primary Examiner* — Adam A Arciero
(74) *Attorney, Agent, or Firm* — Global IP Counselors, LLP (57) ABSTRACT

A bicycle battery holder is basically provided with a holder main body, an engagement unit and an operating unit. The holder main body is configured to hold a plurality of bicycle battery units. The engagement unit is configured to lock the bicycle battery units by engaging the bicycle battery units while the bicycle battery units are disposed in the holder main body. The operating unit is configured to operate the engagement unit.

18 Claims, 4 Drawing Sheets

(56) References Cited

U.S. PATENT DOCUMENTS

| | | | | |
|---|---|---|---|---|
| 2010/0237585 A1* | 9/2010 | Binggeli | ................ | B62K 19/30 |
| | | | | 280/288.4 |
| 2013/0241170 A1* | 9/2013 | Talavasek | ................ | B62M 6/90 |
| | | | | 280/279 |
| 2015/0114734 A1* | 4/2015 | Ogawa | ..................... | B62M 6/90 |
| | | | | 180/68.5 |

FOREIGN PATENT DOCUMENTS

| JP | 10-59243 A | 3/1998 |
|---|---|---|
| JP | 2001-219887 A | 8/2001 |
| JP | 2002-321675 A | 11/2002 |
| JP | 3602837 B2 | 12/2004 |
| JP | 2005-104249 A | 4/2005 |
| JP | 3641055 B2 | 4/2005 |
| JP | 4114978 B2 | 7/2008 |
| JP | 3166805 U | 3/2011 |
| JP | 2011 235749 A | 11/2011 |

\* cited by examiner

BICYCLE BATTERY HOLDER AND BICYCLE BATTERY UNIT

CROSS-REFERENCE TO RELATED APPLICATIONS

This application claims priority to Japanese Patent Application No. 2015-073399, filed on Mar. 31, 2015. The entire disclosure of Japanese Patent Application No. 2015-073399 is hereby incorporated herein by reference.

BACKGROUND

Field of the Invention

This invention generally relates to a bicycle battery holder that is configured to mount a plurality of bicycle battery units, and a bicycle battery unit that can be mounted on the bicycle battery holder.

Background Information

Generally, a bicycle battery holder is known that is configured to mount a plurality of bicycle battery units. One example of a bicycle battery holder having a plurality of bicycle battery units is disclosed in Japanese Patent No. 3,641,055.

SUMMARY

Generally, the present disclosure is directed to various features of a bicycle battery holder and a bicycle battery unit that can be mounted on the bicycle battery holder. In the case where a bicycle battery unit is mounted on the bicycle battery holder, the bicycle battery unit is preferably not detached from the bicycle battery holder.

One object of the present invention is to provide a bicycle battery holder which can easily lock a plurality of bicycle battery units, and a bicycle battery unit which is mounted on this bicycle battery holder.

In view of the state of the known technology and in accordance with a first aspect of the present disclosure, a bicycle battery holder is provided that basically comprises a holder main body, an engagement unit and an operating unit. The holder main body is configured to hold a plurality of bicycle battery units. The engagement unit is configured to lock the bicycle battery units by engaging the bicycle battery units while the bicycle battery units are disposed in the holder main body. The operating unit is configured to operate the engagement unit.

In accordance with a second aspect of the present invention, the bicycle battery holder is configured so that the engagement unit comprises a plurality of engagement portions for individually engaging with the battery units.

In accordance with a third aspect of the present invention, the bicycle battery holder is configured so that the operating unit is configured to move the engagement unit from a first position that engages with the bicycle battery units to a second position that does not engage the bicycle battery units.

In accordance with a fourth aspect of the present invention, the bicycle battery holder further comprises a biasing part that biases the engagement unit to the first position.

In accordance with a fifth aspect of the present invention, the bicycle battery holder is configured so that the operating unit comprises an insertion hole configured to receive a predetermined key, and the operating unit is configured to operate the engagement unit upon the predetermined key being inserted into the insertion hole.

In accordance with a sixth aspect of the present invention, the bicycle battery holder is configured so that the operating unit comprises a rotating part which is rotated when operated, and the rotating part is connected to the engagement unit.

In accordance with a seventh aspect of the present invention, the bicycle battery holder is configured so that the holder main body holds each of the bicycle battery units in a state in which at least a portion of each of the bicycle battery units is exposed.

In accordance with an eighth aspect of the present invention, the bicycle battery holder is configured so that the holder main body comprises a first retaining portion which includes the engagement unit and the operating unit, and the first retaining portion holds each of the ends of the bicycle battery units.

In accordance with a ninth aspect of the present invention, the bicycle battery holder is configured so that the first retaining portion is provided between two adjacent ones of the bicycle battery units, in a state in which the bicycle battery units are held to the holder main body.

In accordance with a tenth aspect of the present invention, the bicycle battery holder is configured so that the holder main body further comprises a second retaining portion which holds an opposite end of a first of the two adjacent ones of the bicycle battery units, and a third retaining portion which holds an opposite end of a second of the two adjacent ones of the bicycle battery unit units.

In accordance with an eleventh aspect of the present invention, the bicycle battery holder is configured so that the first retaining portion is disposed between the second retaining portion and the third retaining portion.

In accordance with a twelfth aspect of the present invention, the bicycle battery holder is configured so that a distance between the first retaining portion and the second retaining portion is equal to a distance between the first retaining portion and the third retaining portion.

In accordance with a thirteenth aspect of the present invention, the bicycle battery holder is configured so that the holder main body further comprises a first connecting portion which connects the first retaining portion and the second retaining portion, and a second connecting portion which connects the first retaining portion and the third retaining portion.

In accordance with a fourteenth aspect of the present invention, the bicycle battery holder is configured so that the first retaining portion, the second retaining portion, the third retaining portion, the first connecting portion, and the second connecting portion are integrally formed.

In accordance with a fifteenth aspect of the present invention, the bicycle battery holder is configured so that the first retaining portion, the second retaining portion, and the first connecting portion form a partially opened rectangular parallelepiped defining a first holding space, and the first retaining portion, the third retaining portion, and the second connecting portion form a partially opened rectangular parallelepiped defining a second holding space.

In accordance with a sixteenth aspect of the present invention, the bicycle battery holder is configured so that the first holding space and the second holding space are each formed to have a smaller volume than a volume of the bicycle battery unit.

In accordance with a seventeenth aspect of the present invention, the bicycle battery holder is configured so that the second retaining portion comprises a fulcrum for disposing the bicycle battery unit relative to the first holding space while being rotated relative to the holder main body, and the third retaining portion comprises a fulcrum for disposing the bicycle battery unit relative to the second holding space while being rotated relative to the holder main body.

In accordance with an eighteenth aspect of the present invention, the bicycle battery holder further comprises an attaching portion for attaching the holder main body to a bicycle frame.

In accordance with a nineteenth aspect of the present invention, the bicycle battery holder is configured so that the holder main body includes a connection terminal that connects with terminals provided to the bicycle battery units.

In accordance with a twentieth aspect of the present invention, the bicycle battery holder is configured so that the holder main body comprises a first retaining portion which includes the engagement unit and the operating unit, and the first retaining portion holds each of the ends of the bicycle battery units, and the connection terminal is provided to the first retaining portion.

In accordance with a twenty-first aspect of the present invention, the bicycle battery holder is configured so that the holder main body further comprises a charging port for connecting an external power source, and the charging port is electrically connected to the connection terminal.

In accordance with a twenty-second aspect of the present invention, the bicycle battery holder according to the twenty-first is configured so that the holder main body comprises a first retaining portion which includes the engagement unit and the operating unit, and the first retaining portion holds each of the ends of the bicycle battery units, and the charging port is provided to the first retaining portion.

In accordance with a twenty-third aspect of the present invention, a bicycle battery unit that is attachable to the bicycle battery holder, and comprising a housing and a plurality of battery elements housed by the housing.

In the bicycle battery holder and the bicycle battery units described above, a plurality of bicycle battery units can be locked with the bicycle battery holder.

Also other objects, features, aspects and advantages of the disclosed bicycle battery holder will become apparent to those skilled in the art from the following detailed description, which, taken in conjunction with the annexed drawings, discloses one illustrative embodiment of the bicycle battery holder.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
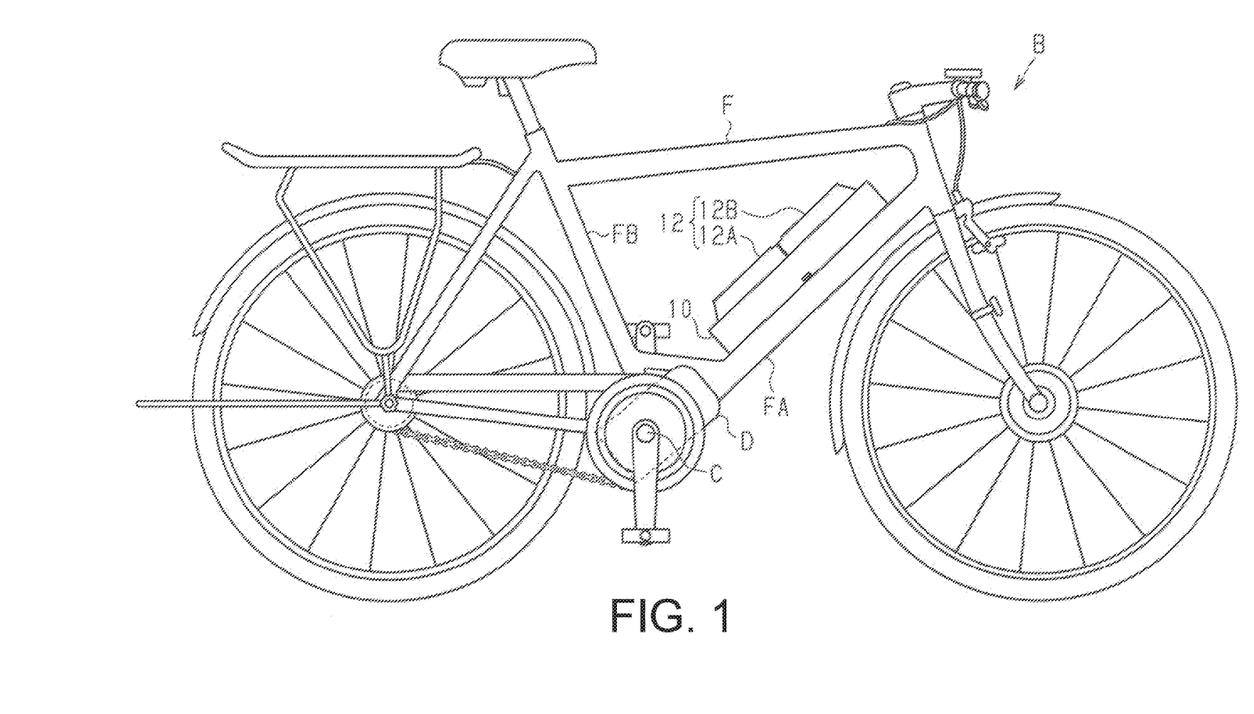
FIG. 1 is a side elevational view of a bicycle equipped with a bicycle battery holder in accordance with one illustrated embodiment.

Referring initially to FIG. 1, a bicycle B is illustrated that is equipped with a bicycle battery holder 10 (hereinafter referred to as "battery holder 10") in accordance with a first embodiment. The bicycle B comprises a frame F, a crankshaft C, a drive unit D and a torque sensor (not shown). The frame F supports various components such as electric components, etc. The crankshaft C is rotatably supported on the frame F. The drive unit D assists a manual drive force that is applied to the crankshaft C. The torque sensor (not shown) detects the manual drive force, and the like. The bicycle B further comprises a battery holder 10 and a plurality of battery units 12. The battery holder 10 is attached to a down tube FA of the frame F. The battery units 12 are mounted on the battery holder 10. While one example of the bicycle B is illustrated, the bicycle B can be any type of bicycle such as a mountain bike or a road bike.

The battery holder 10 comprises a detachable structure with respect to the down tube FA. In another example, the battery holder 10 can be attached to a seat tube FB, or attached to a rear carrier. The battery units 12 comprise a first battery unit 12A and a second battery unit 12B. The battery units 12 supply power to various electric components, including the drive unit D. In the present embodiment, the first battery unit 12A and the second battery unit 12B have the same dimensions.

The drive unit D comprises a control device and an electric motor (both not shown). The electric motor of the drive unit D is driven by the power that is supplied from the battery units 12. The drive unit D can be positioned on various positions on the frame F. For example, the drive unit D can be disposed on a portion of the frame F that is close to the crankshaft C, the rear wheel, and the front wheel. In the case where the drive unit D is disposed in a portion of the frame F that is close to the crankshaft C, the drive unit D transmits torque to the front sprocket. The control device of the drive unit D controls the electric motor based on the detection result of a torque sensor.

Figure 2:
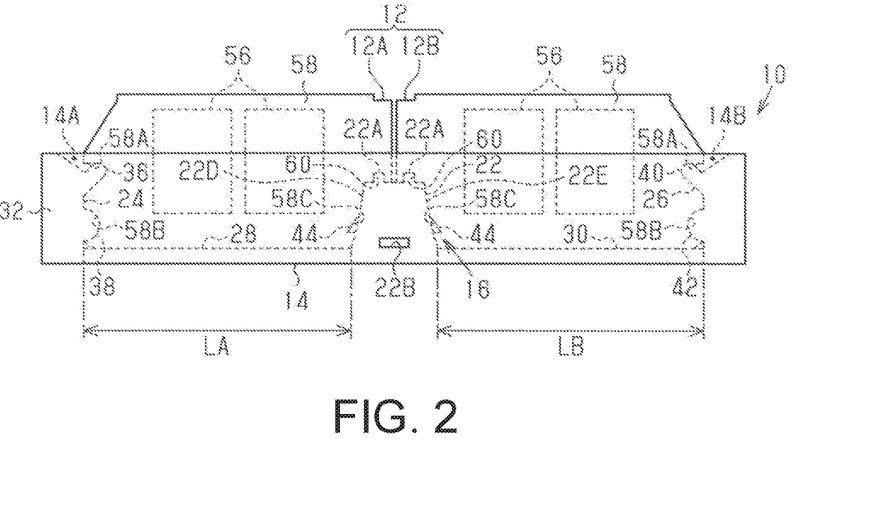
FIG. 2 is a first side elevational view of the bicycle battery holder illustrated in FIG. 1.
Figure 3:
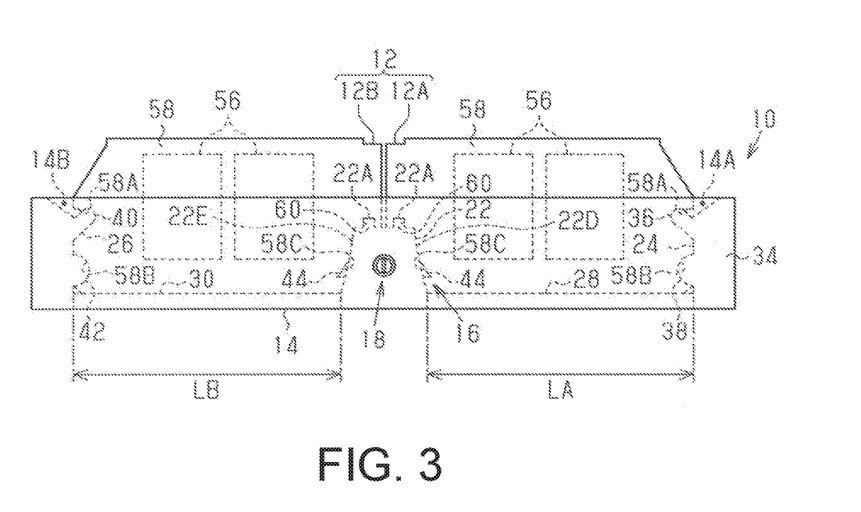
FIG. 3 is a second side elevational view of the bicycle battery holder illustrated in FIGS. 1 and 2.
Figure 4:
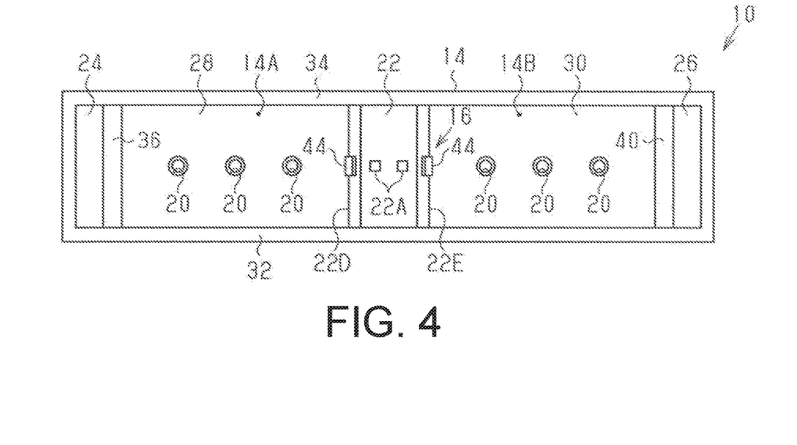
FIG. 4 is a top view of the bicycle battery holder illustrated in FIGS. 1 to 3.

FIG. 2 is a side elevational view of the battery holder 10 in a state in which the battery units 12A and 12B are mounted thereon. FIG. 3 is a second side elevational view of the battery holder 10. FIG. 4 is a top view of the battery holder 10 in a state in which the battery units 12A and 12B are not mounted thereon.

The battery holder 10 comprises a holder main body 14 and an engagement unit 16. The holder main body 14 is configured to hold the battery units 12A and 12B. The engagement unit 16 is configured to lock the battery units 12A and 12B by engaging with each of the battery units 12A and 12B which are held by the holder main body 14. The battery holder 10 further comprises an operating unit 18 and an attaching portion 20. The operating unit 18 operates the engagement unit 16. The attaching portion 20 is mountable to the frame F of the bicycle B. The attaching portion 20 includes a plurality of through-holes formed in a first connecting portion 28 and a second connecting portion 30. The battery holder 10 is detachably fixed to the frame F, with a bolt (not shown) being screwed into a screw hole of the frame F through the attaching portion 20.

As illustrated in FIG. 2 or FIG. 3, the holder main body 14 comprises a first retaining portion 22, a second retaining portion 24 and a third retaining portion 26. The first retaining portion 22 is configured to hold one end of each of the battery units 12A and 12B. The second retaining portion 24 is configured to hold the other end of the first battery unit 12A of the battery units 12. The third retaining portion 26 is configured to hold the other end of the second battery unit 12B of the battery units 12. The holder main body 14 further comprises a first connecting portion 28, a second connecting portion 30 and a pair of sidewalls 32 and 34. The first connecting portion 28 connects the first retaining portion 22 and the second retaining portion 24. The second connecting portion 30 connects the first retaining portion 22 and the third retaining portion 26. The sidewalls 32 and 34 connect the second retaining portion 24 and the third retaining portion 26. The holder main body 14 further comprises a connection terminal 22A and a charging port 22B. The connection terminal 22A is connected to a connection terminal 60 of the battery unit 12. The charging port 22B is connected an external power source. The bottom portions of the sidewalk 32 and 34 are connected to the first connecting portion 28 and the second connecting portion 30, respectively.

The first retaining portion 22 is disposed between the second retaining portion 24 and the third retaining portion 26 in the longitudinal direction of the holder main body 14. That is, the first retaining portion 22 is provided between the first battery unit 12A and the second battery unit 12B, in a state in which the battery units 12 are held by the holder main body 14. The engagement unit 16 and the operating unit 18 are provided to the first retaining portion 22.

A distance LA between the first retaining portion 22 and the second retaining portion 24 in the longitudinal direction of the holder main body 14 is substantially equal to A distance LB between the first retaining portion 22 and the third retaining portion 26 in the longitudinal direction of the holder main body 14. The distance LA is substantially equal to the dimension of the first connecting portion 28 in the longitudinal direction of the holder main body 14. The distance LB is substantially equal to the dimension of the second connecting portion 30 in the longitudinal direction of the holder main body 14. The battery holder 10 of the present embodiment is configured to mount two battery units 12 having the same dimensions.

The first retaining portion 22, the second retaining portion 24, the third retaining portion 26, the first connecting portion 28, the second connecting portion 30 and the sidewalls 32 and 34 are integrally formed. The first retaining portion 22, the second retaining portion 24, the third retaining portion 26, the first connecting portion 28, the second connecting portion 30, and the sidewalls 32 and 34 are, for example, formed of a resin material. The connection terminal 22A is provided to the first retaining portion 22. The connection terminal 22A is provided on the upper surface of the first retaining portion 22, and protrudes upwardly. The connection terminal 22A can also be provided so as not to protrude on the upper surface of the first retaining portion 22, or be provided in a recess that is formed on the upper surface of the first retaining portion 22. Each of the battery units 12 has a plurality of the connection terminals 22A. The charging port 22B is provided to the first retaining portion 22 and electrically connected with the connection terminal 22A. The charging port 22B is provided to the center of one side surface of the first retaining portion 22 in the widthwise direction. In the case that the connection terminal 22A and the charging port 22B are provided to the first retaining portion 22, the wiring that connects these two can be shortened.

The first retaining portion 22, the second retaining portion 24, the first connecting portion 28, and the sidewalls 32 and 34 form an upwardly opened first holding space 14A. The volume of the first holding space 14A is smaller than the volume of the first battery unit 12A. In the case where the first battery unit 12A is mounted on the holder main body 14, the upper portion of the first battery unit 12A is exposed from the holder main body 14. The volume of the upper portion of the first battery unit 12A that is exposed from the holder main body 14 is substantially the same as the difference between the volume of the entire first battery unit 12A and the volume of the first holding space 14A.

The first retaining portion 22, the third retaining portion 26, the second connecting portion 30, and the sidewalls 32 and 34 form an upwardly opened second holding space 14B. The volume of the second holding space 14B is smaller than the volume of the second battery unit 12B. In the case that the second battery unit 12B is mounted on the holder main body 14, the upper portion of the second battery unit 12B is exposed from the holder main body 14. The volume of the upper portion of the second battery unit 12B that is exposed from the holder main body 14 is substantially the same as the difference between the volume of the entire second battery unit 12B and the volume of the second holding space 14B. When viewed from the widthwise direction of the battery holder 10, the sidewalls 32 and 34 extend to a position that is higher than the position of the engagement unit 16, and in the present embodiment, extend to a position that is higher than the upper surface of the first retaining portion 22.

The second retaining portion 24 comprises a fulcrum 36 and a projection 38. The fulcrum 36 is provided for disposing the battery unit 12 relative to the first holding space 14A while being rotated relative to the holder main body 14. The projection 38 is provided for supporting the battery unit 12 that is disposed relative to the first holding space 14A. The fulcrum 36 and the projection 38 protrude from the side surface of the second retaining portion 24 on the side with the first retaining portion 22 towards the first holding space 14A. The longitudinal direction of the fulcrum 36 and the projection 38 match the widthwise direction of the holder main body 14. The widthwise direction of the holder main body 14 corresponds to the widthwise direction of the bicycle B, in a state in which the holder main body 14 is attached to the bicycle B.

The third retaining portion 26 comprises a fulcrum 40 and a projection 42. The fulcrum 40 is provided for disposing the battery unit 12 relative to the second holding space 14B while being rotated relative to the holder main body 14. The projection 42 is provided for supporting the battery unit 12 that is disposed relative to the second holding space 14B. The fulcrum 40 and the projection 42 protrude from the side surface of the third retaining portion 26 on the side with the first retaining portion 22 towards the second holding space 14B. The longitudinal direction of the fulcrum 40 and the projection 42 match the width direction of the holder main body 14.

The engagement unit 16 comprises a pair of engagement portions 44 for engaging individually with the plurality of battery units 12. The engagement portions 44 are disposed so as to be each configured to protrude from a guide hole 22C (see FIG. 6), which is formed in the first retaining portion 22.

Figure 6:
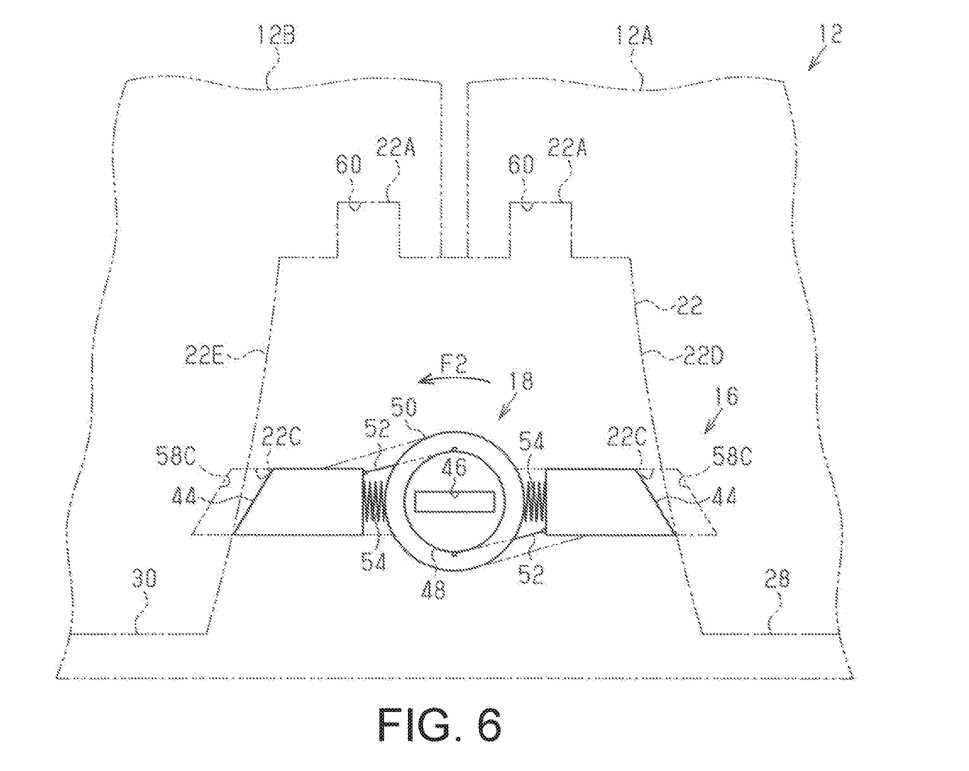
FIG. 6 is an enlarged, partial side elevational view of the engagement unit and the operating unit in a second position.

The engagement portion 44 is configured by a claw-like member. The openings of the guide hole 22C are formed on a first side surface portion 22D of the first retaining portion 22 that faces the second retaining portion 24, and on a second side surface portion 22E of the first retaining portion 22 that faces the third retaining portion 26. The first side surface portion 22D is inclined in a direction that approaches the second retaining portion 24 when heading toward the first connecting portion 28. The second side surface portion 22E is inclined in a direction that approaches the third retaining portion 26 when heading toward the second connecting portion 30.

The operating unit 18 moves the pair of the engagement portions 44 from a first position where the pair engage with the first battery unit 12A or the second battery unit 12B, to a second position in which the pair do not engage with the first battery unit 12A or the second battery unit 12B. Each engagement portion 44 is provided movably in the longitudinal direction of the battery holder 10.

The battery unit 12 comprises a plurality of battery elements 56, a housing 58 and a connection terminal 60. The housing 58 houses the battery elements 56. The connection terminal 60 is connected with the connection terminal 22A of the holder main body 14. The battery element 56 is configured to be rechargeable.

The housing 58 of the battery units 12A, 12B comprises a first recess 58A, a second recess 58B and an engagement hole 58C. The first recess 58A has a shape that corresponds to the fulcrum 36. The second recess 58B has a shape that corresponds to the projection 38. The engagement portion 44 is inserted the engagement hole 58C.

The first recess 58A and the second recess 58B are formed on a first end of the housing 58. The engagement hole 58C is formed on a second end of the housing 58, which is the end on the opposite side of the first end. A connection terminal 60 is provided at a position that comes in contact with the connection terminal 22A of the housing 58, in a state in which the battery unit 12 is attached to the battery holder 10. The second end of the housing 58 of the first battery unit 12A covers both the upper surface and the first side surface portion 22D of the first retaining portion 22 in a state in which the battery unit 12 is attached to the battery holder 10. The second end of the housing 58 of the second battery unit 12B covers both the upper surface and the second side surface portion 22E of the first retaining portion 22 in a state in which the battery unit 12 is attached to the battery holder 10. A slight gap is formed between the first battery unit 12A and the second battery unit 12B, in a state in which the battery unit 12 is attached to the battery holder 10.

Figure 5:
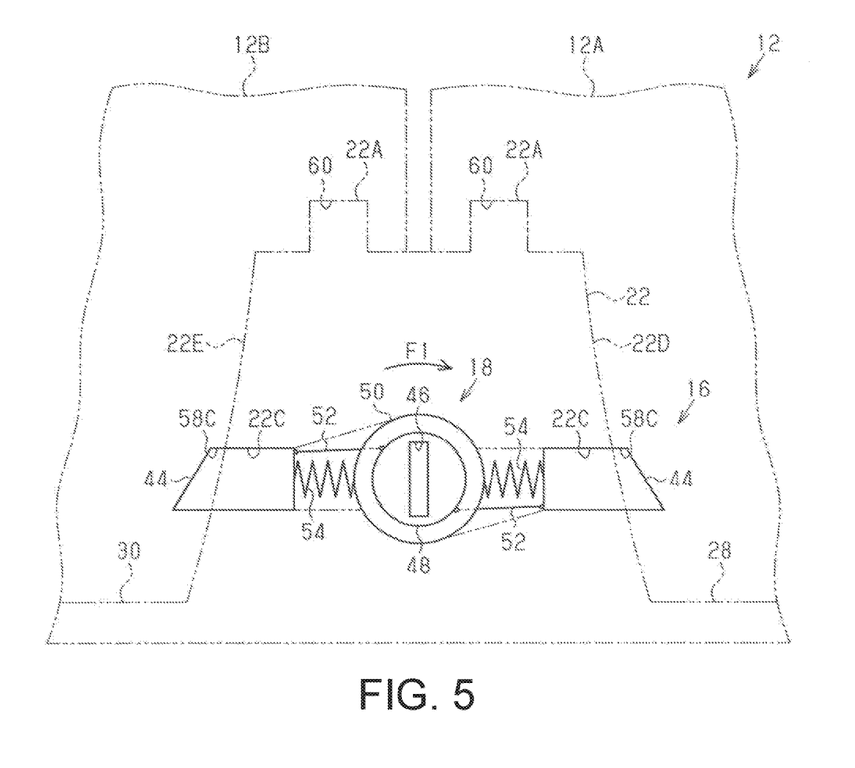
FIG. 5 is an enlarged, partial side elevational view of the engagement unit and the operating unit in a first position.

FIGS. 5 and 6 are enlarged side elevational views of the engagement unit 16 and the first retaining portion 22. The operating unit 18 comprises a rotating part 48, a case 50, a pair of wires 52 and a pair of springs 54. The rotating part 48 includes an insertion hole 46 in which is inserted a predetermined key (not shown). The case 50 houses the rotating part 48. The wires 52 connect to each of the rotating part 48 and the engagement portion 44. The springs 54 bias the engagement portions 44 at a first position. The spring 54 is one example of a biasing part. The spring 54 is, for example, a compression coil spring. The insertion hole 46 of the rotating part 48 is opened to the other side surface of the first retaining portion 22 in the widthwise direction.

The springs 54 are each disposed relative to the guide hole 22C of the first retaining portion 22. One end of the wire 52 is connected to the engagement portion 44. The other end of the wire 52 is connected to the rotating part 48. The one end of the spring 54 is connected to the engagement portion 44. The other end of the spring 54 is connected to the case 50.

The shape of the rotating part 48 is a columnar shape. The shape of the case 50 is a cylindrical shape. The rotating part 48 is housed in the case 50 in a rotatable state with respect to the case 50. The rotational position of the rotating part 48 with respect to the case 50 is changed by inserting and turning a key in the insertion hole 46.

As shown in FIG. 5, when the rotating part 48 is in a first rotational position, the engagement portion 44 is held in the first position by the elastic force of the spring 54. The wire 52 is held in a state in which substantially no slack is generated.

As shown in FIG. 6, when the rotating part 48 is in a second rotational position, the engagement portion 44 is held in the second position with the spring 54 being compressed by the tensile force of the wire 52. The wire 52 is held in astute in which substantially no slack is generated.

The effect of the battery holder 10 will be described with reference to FIGS. 2 to 7.

The battery units 12 are mounted on the battery holder 10 and locked to the battery holder 10 by, for example, the following procedure.

Figure 7:
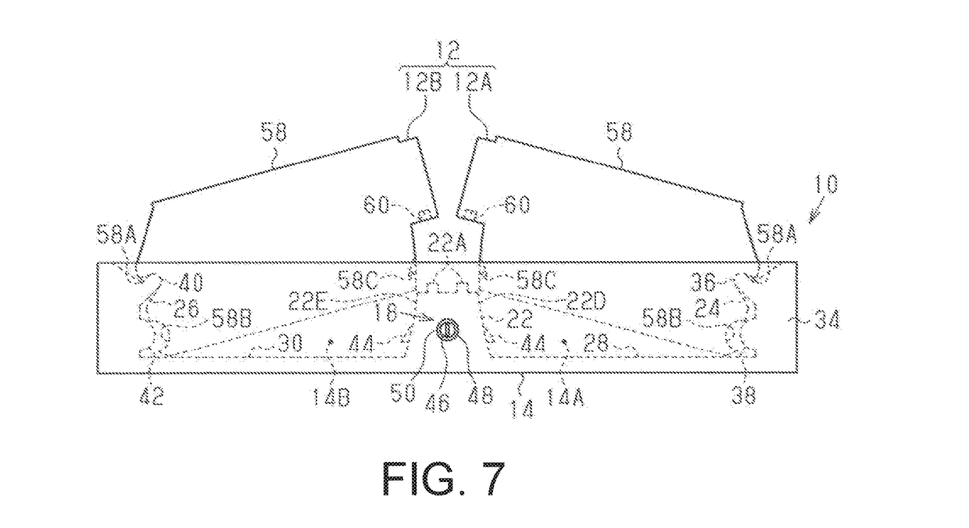
FIG. 7 is a second side elevational view of the bicycle battery holder while the bicycle battery units are being attached.

In a state in which the battery units 12 are detached from the battery holder 10, the rotating part 48 is in the first rotational position, and the engagement portion 44 is disposed in the first position, as shown in FIG. 5. As shown in FIG. 7, first, the user puts the first recess 58A of the first battery unit 12A in contact with the fulcrum 36. Next, the user moves the first battery unit 12A on as to rotate around the fulcrum 36 toward the first connecting portion 28. In this way, when the end of the housing 58 of the first battery unit 12A approaches the first retaining portion 22, the housing 58 of the first battery unit 12A contacts the engagement portion 44, and pushes the engagement portion 44 toward the second position. The end of the housing 58 of the first battery unit 12A contacts the first retaining portion 22. Also at the same time as the engagement portion 44 is inserted into the engagement hole 58C, the projection 38 is fitted into the second recess 58B, and the first battery unit 12A is held to the battery holder 10. In this way, when the first battery unit 12A is mounted on the battery holder 10, the first battery unit 12A is automatically locked to the battery holder 10 by the engagement portion 44.

Next, the second battery unit 12B is mounted on the battery holder 10 by the same procedure. The mounting order of the first battery unit 12A and the second battery unit 12B is arbitrary.

The battery units 12 are detached from the battery holder 10 by, for example, the following procedure. The user inserts a key into the insertion hole 46 of the rotating part 48, which is in the first rotational position shown in FIG. 5, and turns the key in a first rotational direction F1. The rotating part 48 is thereby turned in the first rotational direction F1 with respect to the case 50.

With the rotation of the rotating part 48 in the first rotational direction F1, the engagement portion 44 is moved from the first position shown in FIG. 5 to the second position shown in FIG. 6 by the wire 52. When the rotating part 48 is moved to the second rotational position, as shown in FIG. 6, the engagement portions 44 will separate from the engagement hole 58C of the first battery unit 12A or the second battery unit 12B, respectively, and the lock is released. In this state, the user is able to detach the first battery unit 12A and the second battery unit 12B from the battery holder 10. When the rotating part 48 is in the second rotational position and the user releases the hand from the key, the engagement portion 44 is pushed to the first position by the swing 54; with this, the rotating part 48 is rotated in a second rotational direction F2, which is the opposite of the first rotational direction F1, and returns to the first rotational position. The key can be configured to be removable from the insertion hole 46 only when the rotating part 48 is in the first rotational position, or, the key can be configured to be removable from the insertion hole 46 when the rotating part 48 is in either the first rotational position or in the second rotational position.

In the present embodiment, the rotating part 48 is configured to return from the second rotational position to the first rotational position even if the user does not turn the key. However, a mechanism for holding the rotating part 48 to the second rotational position can be provided. In the case that the battery unit 12 is mounted on the battery holder 10, in a state in which the rotating part 48 is in the second rotational position, after the battery unit 12 is held to the battery holder 10, the user moves the rotating part 48 to the first rotational position by turning the key in the second rotational direction F2. The battery unit 12 is thereby locked to the battery holder 10. In addition, a configuration can be employed in which, when the rotating part 48 is rotated to the second rotational position shown in FIG. 6 and the key is pulled out of the insertion hole 46, the rotational position of the rotating part 48 with respect to the case 50 is held in the second rotational position.

According to the battery holder 10, for example, the following effects can be obtained.

(1) The battery holder 10 comprises the engagement unit 16 for locking the battery units 12 by operating one operating unit 18. Accordingly, the battery units 12 can be easily locked to the battery holder 10.

(2) The battery holder 10 comprises the holder main body 14 which can hold the battery units 12 so that the upper portions of the battery units 12 are exposed. Accordingly, the battery unit 12 is easily mounted on the holder main body 14, and a user can easily grip the mounted battery unit 12.

(3) The battery holder 10 comprises the first retaining portion 22 for holding one ends of the battery units 12. Accordingly, the battery units 12 which are mounted on the battery holder 10 will not easily fall off from the battery holder 10.

(4) The battery holder 10 comprises the second retaining portion 24 for holding the other end of the first battery unit 12A. Accordingly, the first battery unit 12A which is mounted on the battery holder 10 will not easily fall off from the battery holder 10.

(5) The battery holder 10 comprises the third retaining portion 26 for holding the other end of the second battery unit 12B. Accordingly, the second battery unit 12B which is mounted on the battery holder 10 will not easily fall off from the battery holder 10.

(6) The battery holder 10 comprises the first connecting portion 28 which supports the first battery unit 12A by connecting the first retaining portion 22 and the second retaining portion 24. Accordingly, the posture of the first battery unit 12A is stabilized with respect to the battery holder 10.

(7) The battery holder 10 comprises the second connecting portion 30 which supports the second battery unit 12B by connecting the first retaining portion 22 and the third retaining portion 26. Accordingly, the posture of the second battery unit 12B is stabilized with respect to the battery holder 10.

(8) The battery holder 10 comprises the connection terminal 2A and a charging port 22B which are disposed to the first retaining portion 22. Accordingly, the connection terminal 22A and the charging port 22B are disposed near each other, so the wiring, etc., can be shortened.

MODIFIED EXAMPLES

The description relating to the above-described embodiment is an example of forms that the bicycle battery holder according to the present invention can take, and is not intended to limit the forms thereof. The bicycle battery holder according to the present invention can, in addition to the embodiment, take the forms of the modified examples of the embodiment shown below, as well as forms that combine at least two modified examples that are not mutually contradictory.

The battery holder 10 of a modified example comprises a biasing part which is configured to move the position of the engagement portion 44 to each of a first position and a second position, and a battery detection sensor for detecting that the battery unit 12 has been disposed relative to either a first holding space 14A or a second holding space 14B. An example of a biasing part is an electric motor. An example of a battery detection sensor is a photoelectric sensor or a magnetic sensor. The biasing part moves the engagement portion 44 from the second position to the first position, based on the battery unit 12 being detected by the battery detection sensor.

In the battery holder 10 of a modified example, three or more battery units 12 can be mounted. The configuration of the engagement unit 16 can be changed according to the number of mountable battery units 12. In one example, the battery holder 10 comprises one engagement unit 16 which can engage with all of the battery units 12. In another example, the battery units 12 are classified into a plurality of groups, and the battery holder 10 comprises a plurality of the engagement units 16 corresponding to each group. When the battery units 12 are included in a group, the engagement unit 16 that corresponds to the group engages with all of the battery units 12 included in that group. When one battery unit 12 is included in a group, the engagement unit 16 that corresponds to the group engages with that battery unit 12.

In the battery holder 10 of a modified example, at least one of the sidewall and the sidewall 34 is omitted. According to this modified example, the battery unit 12 can be mounted on the first holding space 14A or the second holding space 14B from the side of the holder main body 14. When employing a configuration in which the battery unit 12 is mounted from the side of the holder main body 14, the fulcrum 36 and the projection 38 become parallel to the direction that is perpendicular to the longitudinal direction and the widthwise direction of the holder main body 14.

In the battery holder 10 of a modified example, the connection terminal 22A is disposed relative to each of the second retaining portion 24 and the third retaining portion 26. As concerns the first retaining portion 22, the connection terminal 22A can be disposed on a surface on which is formed the opening of the guide hole 22C, or be disposed relative to each of the first connecting portion 28 and the second connecting portion 30.

In the battery holder 10 of a modified example, the charging port 22B is disposed relative to at least one of the second retaining portion 24 and the third retaining portion 26.

In the battery holder 10 of a modified example, the distance LA is longer, or shorter, than the distance LB. That is, in the battery holder 10 of this modified example, two types of battery units 12 having different dimensions can be mounted.

In the battery holder 10 of a modified example, at least one of the first connecting portion 28 and the second connecting portion 30 is omitted.

In the battery holder 10 of a modified example, each of the first retaining portion 22, the second retaining portion 24, and the third retaining portion 26 can comprise an attaching portion 20 that can be attached to the frame F. In the battery holder 10 of another modified example, at least one of the first retaining portion 22, the second retaining portion 24, the third retaining portion 26, the first connecting portion 28, and the second connecting portion 30 can comprise an attaching portion 20 that can be attached to the frame F.

In the battery holder 10 of a modified example, the first holding space 14A and the second holding space 14B are aligned in the widthwise direction of the holder main body 14. That is, one of the second retaining portion 24 or the third retaining portion 26 is omitted, and the other of the second retaining portion 24 or the third retaining portion 26 holds the two battery units 12.

In the battery holder 10 of a modified example, the volume of the first holding space 14A is larger, or smaller, than the second holding space 14B. That is, in the battery holder 10 of this modified example, two types of the battery units 12 having different dimensions can be mounted.

In the battery holder 10 of a modified example, the volume of the first holding space 14A is larger than the volume of the battery unit 12A, or, substantially equal to the volume of the battery unit 12A.

In the battery holder 10 of a modified example, the volume of the second holding space 14B is larger than the volume of the battery unit 12B, or, substantially equal to the volume of the battery unit 12B.

In the battery holder 10 of a modified example, the holder main body 14 can be integrally formed with the frame F. In the battery holder 10 of a modified example, the holder main body 14 can be inseparably mounted on the frame F by a fixing member such as an adhesive.

In the battery holder 10 of a modified example, the insertion hole 46 of the rotating part 48 can be opened to one side of the first retaining portion 22 in the widthwise direction.

In the battery holder 10 of the present embodiment, when the rotating part 48 is moved to the second rotational position, the pair of engagement portions 44 move from the first position to the second position at the same time; however, in the battery holder of a modified example 10, the timing with which the pair of engagement portions 44 move from the first position to the second position can be offset, when the rotating part 48 is moved to the second rotational position. This type of configuration can be realized by varying the length of the wire 52.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle battery holder. Accordingly, these directional terms, as utilized to describe the bicycle battery holder should be interpreted relative to a bicycle in an upright riding position on a horizontal surface and that is equipped with the bicycle battery holder. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents,

What is claimed is:
1. A bicycle battery holder comprising:
 a holder main body configured to hold a plurality of battery units including a first bicycle battery unit and a second bicycle battery unit, each of the first bicycle battery unit and the second bicycle battery unit including a housing holding a plurality of battery elements:
at least two engagement protrusions configured to lock the plurality of bicycle battery units by engaging the plurality of bicycle battery units while the plurality of bicycle battery units are disposed in the holder main body; and
an operating unit configured to move the at least two engagement protrusions,
the holder main body comprising:
a first retaining portion that holds a first end of each housing of the plurality of bicycle battery units, the first retaining portion being provided between the first bicycle battery unit and the second bicycle battery unit, the first and second bicycle battery units being adjacent to each other,
a second retaining portion that holds a second end of the first bicycle battery unit, the second end of the first bicycle battery unit being opposite the first end of the first bicycle battery unit, and
a third retaining portion that holds a second end of the second bicycle battery unit, the second end of the second bicycle battery unit being opposite the first end of the second bicycle battery unit,
the first retaining portion being disposed between the second retaining portion and the third retaining portion, and
wherein the at least two engagement protrusions are provided on the first retaining portion.

2. The bicycle battery holder as recited in claim 1, wherein
the at least two engagement protrusions individually engage each of the plurality of battery units.

3. The bicycle battery holder as recited in claim 1, wherein
the operating unit is configured to move the at least two engagement protrusions from a first position that engages the plurality of bicycle battery units to a second position that does not engage the plurality of bicycle battery units.

4. The bicycle battery holder as recited in claim 3, further comprising
a biasing part that biases the at least two engagement protrusions to the first position.

5. The bicycle battery holder as recited in claim 1, wherein
the operating unit comprises an insertion hole configured to receive a predetermined key, and the operating unit is configured to move the at least two engagement protrusions upon the predetermined key being inserted into the insertion hole.

6. The bicycle battery holder as recited in claim 1, wherein
the operating unit comprises a rotating part which is rotated when operated, and
the rotating part is connected to the at least two engagement protrusions.

7. The bicycle battery holder as recited in claim 1, wherein
the holder main body holds each of the plurality of bicycle battery units in a state in which at least a portion of each of the plurality of bicycle battery units is exposed.

8. The bicycle battery holder as recited in claim 1, wherein
a distance between the first retaining portion and the second retaining portion is equal to a distance between the first retaining portion and the third retaining portion.

9. The bicycle battery holder as recited in claim 1, wherein
the holder main body further comprises a first connecting portion which connects the first retaining portion and the second retaining portion, and a second connecting portion which connects the first retaining portion and the third retaining portion.

10. The bicycle battery holder as recited in claim 9, wherein
the first retaining portion, the second retaining portion, the third retaining portion, the first connecting portion, and the second connecting portion are integrally formed.

11. The bicycle battery holder as recited in claim 10, wherein
the first retaining portion, the second retaining portion, and the first connecting portion form a partially opened rectangular parallelepiped defining a first holding space, and the first retaining portion, the third retaining portion, and the second connecting portion form a partially opened rectangular parallelepiped defining a second holding space.

12. The bicycle battery holder as recited in claim 11, wherein
the first holding space and the second holding space are each formed to have a smaller volume than a volume of the bicycle battery unit.

13. The bicycle battery holder as recited in claim 11, wherein
the second retaining portion comprises a fulcrum for disposing the bicycle battery unit relative to the first holding space while being rotated relative to the holder main body, and
the third retaining portion comprises a fulcrum for disposing the bicycle battery unit relative to the second holding space while being rotated relative to the holder main body.

14. The bicycle battery holder as recited in claim 1, further comprising
an attaching portion for attaching the holder main body to a bicycle frame.

15. The bicycle battery holder as recited in claim 1, wherein
the holder main body includes a connection terminal that connects with terminals provided to each of the plurality of bicycle battery units.

16. The bicycle battery holder as recited in claim 15, wherein
the connection terminal is provided to the first retaining portion.

17. The bicycle battery holder as recited in claim 16, wherein
the holder main body further comprises a charging port for connecting an external power source, and
the charging port is electrically connected to the connection terminal.

18. The bicycle battery holder as recited in claim 17, wherein
the charging port is provided to the first retaining portion.

* * * * *